F. E. BALDWIN.
BOTTLE OR LIKE CLOSURE.
APPLICATION FILED APR. 9, 1921.

1,410,237.

Patented Mar. 21, 1922.

WITNESS:

INVENTOR
Frederic E. Baldwin
BY
Augustus B. Stoughton.
ATTORNEY.

UNITED STATES PATENT OFFICE.

FREDERIC E. BALDWIN, OF PHILADELPHIA, PENNSYLVANIA.

BOTTLE OR LIKE CLOSURE.

1,410,237.       Specification of Letters Patent.     Patented Mar. 21, 1922.

Application filed April 9, 1921. Serial No. 459,885.

*To all whom it may concern:*

Be it known that I, FREDERIC E. BALDWIN, a citizen of the United States, residing at Philadelphia, in the county of Philadelphia and State of Pennsylvania, have invented a new and useful Improvement in Bottle or like Closures, of which the following is a specification.

The principal object of the present invention is to provide a simple, comparatively inexpensive and efficient closure especially adapted for hot water bottles but useful for other things and which can be easily opened and closed and which when closed affords a very tight joint adapted to resist considerable water and other pressure.

The invention will be claimed at the end hereof but will be first described in connection with the embodiment of it chosen for illustration in the accompanying drawings forming part hereof and in which—

Figure 1:
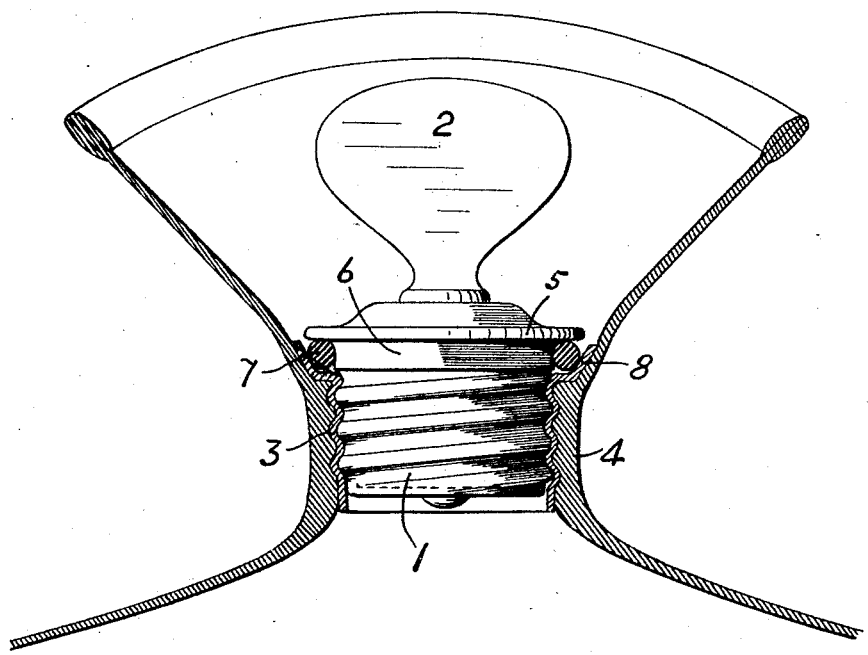
Figure 2:
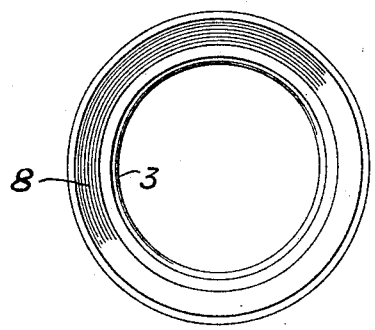

Figure 1 is an elevational view, principally in central section, illustrating a closure embodying features of the invention, and Fig. 2 is a top or plan view of the socket element of the closure with the other elements omitted.

In the drawings 1 is an externally threaded plug shown as provided with a hand piece 2, and 3 is a socket shown as externally and internally threaded and as mounted in the filling opening 4 of a hot water bottle. These are well understood parts and they are referred to in order to facilitate an understanding of my invention. 5 is an annular flange wall provided at the top of the plug 1 in proximity with a cylindrical surface or wall 6 adapted to accommodate an elastic gasket 7 of circular cross section. 8 is an annular flaring neck wall provided on the top of the socket 3 and arranged to confront the plug flange top wall 5 and in connection with the wall 6 to provide an annular chamber of tapering cross-section into which the gasket 7 is tightly pressed by the wall 5 when the plug 1 is screwed into the socket 3.

In use the gasket 7 remains on the plug 1, and when the plug is screwed into the socket the gasket is jammed, pressed or squeezed between the walls 5, 6 and 8, being if necessary moved on the plug thereby, and thus a very tight joint is provided by the application of comparatively little power to turn the plug. Furthermore the plug can be readily withdrawn because the gasket does not oppose that operation.

In this connection it may be said that the parts 5 and 8 should have non-sulphating surfaces so that the gasket will not adhere to them, and the gasket should be stretched tight on the plug so that it will not bunch up and jam when the plug is unscrewed.

I claim:

1. A closure having in combination a screw threaded member, a screw threaded socket member, and a readily deformable gasket located between the two members, the surface of one of said members being flaring and adapted to deform and compress the gasket toward the center of the closure, the other member having an annular flange wall engaging the gasket, thereby causing a rolling action of the gasket on the flaring member when the screw threaded member is screwed into the threaded socket.

2. In a bottle or like closure comprising a hand piece provided with a threaded plug and an internally threaded socket the combination of an annular flange wall and a cylindrical wall provided at the top of the plug, an annularly flaring neck wall provided on the top of the socket and confronting said flange and cylindrical walls and forming a chamber tapering in cross-section, and an elastic gasket of circular cross-section and readily deformable and carried by the plug and engaging the annular flange wall, whereby the gasket has a rolling action on the flaring neck when the plug is screwed in the threaded socket.

FREDERIC E. BALDWIN.